United States Patent Office 2,781,407
Patented Feb. 12, 1957

2,781,407

PREPARATION OF ALKYL-SUBSTITUTED AROMATIC COMPOUNDS

Louis Schmerling, Riverside, Ill., assignor to Universal Oil Products Company, Des Plaines, Ill., a corporation of Delaware No Drawing. Application January 28, 1955,
Serial No. 484,841

15 Claims. (Cl. 260—668)

This invention relates to a process for preparing aromatic compounds and more particularly to the preparation of alkyl-substituted aromatic hydrocarbons.

The increased use of terephthalic acid as an intermediate in the preparation of synthetic fibers of the glycol-terephthalic type has increased the demand for para-xylene from which the terephthalic acid is prepared. Heretofore, the separation of para-xylene from its ortho- and meta-isomers has been relatively expensive due to difficulties encountered in the process involving the separation of the aforementioned isomers. For example, one method for obtaining para-xylene from mixtures with ethylbenzene and isomers of said para-xylene is to subject the mixture (o-xylene, m-xylene, p-xylene and ethylbenzene) to fractional distillation. However, inasmuch as para-xylene, meta-xylene and ethylbenzene all boil within a 1° C. range of each other, separation into the various components by fractional distillation is relatively difficult to accomplish.

One method of operation is to distill out the o-xylene which has a boiling point of approximately 5 to 6° above that of the other three components of the mixture. The para- and meta-xylene along with the ethylbenzene will then be separated into three fractions, the lightest cut containing the highest percentage of para-xylene which may then be separated out by crystallization. Another method of separating the para-xylene from the unwanted isomers is to displace the eutectic compositions of para- and meta-xylenes by the addition of a solvent such as pentane followed by cooling, the para-xylene thereby separating out of the mixture, and thereafter crystallizing said para-xylene.

Still another method of recovering para-xylene is to partially sulfonate the mixture, separate the unsulfonated layer from the reaction mixture and crystallize the para-xylene from the mixture by lowering the temperature.

It can readily be seen from the above description that obtaining relatively pure para-xylene for the manufacture of terephthalic acid involves many steps which, as hereinbefore set forth, are relatively difficult and expensive to accomplish.

It is therefore an object of this invention to provide a relatively inexpensive and novel process for obtaining alkyl-substituted aromatic compounds.

A further object of this invention is to provide a process for preparing para-dialkyl-substituted aromatic compounds such as para-xylene.

A specific object of this invention is to provide a process for preparing alkyl-substituted aromatic compounds by condensing an alkyl furan with an alkene and aromatizing the resultant epoxide.

One embodiment of this invention resides in a process for preparing an aromatic compound containing at least one alkyl substituent by condensing an alkyl furan with an alkene and treating the resultant epoxide with a hydrogen halide to form the desired alkyl-substituted aromatic compound.

A further embodiment of this invention resides in a process for preparing benzene containing at least one alkyl substituent by condensing an alkyl furan with an alkene and treating the resultant epoxide with hydrobromic acid in acetic acid to form the desired alkyl-substituted benzene.

A specific embodiment of the invention resides in a process for preparing polyalkyl-substituted benzene by condensing a 2,5-dialkyl furan with an alkene and treating the resultant epoxide with hydrobromic acid in acetic acid to form the desired polyalkyl-substituted benzene.

A more specific embodiment of the invention resides in a process for the preparation of para-xylene by condensing 2,5-dimethylfuran with ethylene and treating the resultant epoxide with hydrobromic acid in acetic acid to form para-xylene.

Other objects and embodiments referring to alternative alkyl furans and to alternative alkenes will be found in the following further detailed description of the invention.

It is now proposed that aromatic compounds containing at least one alkyl substituent be prepared by reacting or condensing an alkyl-substituted furan with an alkene and that the resultant epoxide be aromatized by treating said compound with an acid. The aromatic compounds containing at least one alkyl substituent prepared by the process of this invention may be used for many purposes in organic chemistry. For example, toluene may be used as an intermediate in the preparation of trinitrotoluene, a well known explosive. Also, as hereinbefore discussed, para-xylene which may also be prepared by this invention is used as an intermediate in the preparation of terephthalic acid, which in turn is used in the preparation of synthetic fibers of the glycol-terephthalic type.

Alkyl substituted furans which may be used in the process of this invention include 2-methylfuran, 3-methylfuran, 2-ethylfuran, 3-ethylfuran, 2-propylfuran, 3-propylfuran, 2,3-dimethylfuran, 2,4-dimethylfuran, 2,5-dimethylfuran, 2,3-diethylfuran, 2,4-diethylfuran, 2,5-diethylfuran, 2,3-dipropylfuran, 2,4-dipropylfuran, 2,5-dipropylfuran, 2-methyl-3-ethylfuran, 2-methyl-4-ethylfuran, 2-methyl-5-ethylfuran, 2-ethyl-3-propylfuran, 2-ethyl-4-propylfuran, 2-ethyl-5-propylfuran, etc.

Alkenes which may be condensed with the aforementioned alkyl-substituted furans include ethylene, propene, 1-butene, 2-butene, methylpropene, 1-pentene, 2-pentene, 3-pentene, etc. It is to be understood that the above mentioned compounds are only examples of the alkyl-substituted furans and alkenes which may be used in this invention and that said invention is not necessarily limited thereto. In addition, it is also contemplated within the scope of this invention that cycloalkenes such as cyclohexene may be condensed with the alkyl-substituted furans if a derivative of naphthalene is desired.

The epoxide which results from the condensation of the alkyl-substituted furan and the alkene may be aromatized by treating said epoxide with an acidic substance such as hydrogen halide, sulfuric acid, phosphoric acid, and other protonic acids, the preferred acid being hydrogen bromide; hydrochloric acid, hydroiodic acid and hydrofluoric acid may also be used although not necessarily with equivalent results. The hydrogen halide may be mixed, if so desired, with a low molecular weight organic acid such as acetic acid.

The condensation of the alkyl-substituted furan and the alkenes is carried out at a temperature in the range of from about 50° C. to about 300° C. and preferably in a range of from about 75° C. to about 200° C. In addition, super-atmospheric pressures ranging from about 2 to about 100 atmospheres may be used to maintain the reactants in substantially liquid phase, said pressure being provided in part by the alkene, if a normally gaseous alkene is used, or by an inert gas such as nitrogen.

The second step of this invention is carried out by treating the epoxide which is formed in the first step with an acid at a temperature in the range of from about 0° C. to about 150° C., depending on the epoxide and the acid. When operating with a solution of hydrogen bromide in acetic acid, for example, temperatures in the range of from about 50° C. to about 120° C. are preferred. At least 1.0, and preferably 2.0, moles of hydrogen bromide per mole of epoxide should be used in order to obtain the highest yields of the desired alkylbenzene.

The process of this invention may be effected in any suitable manner and may comprise either a batch or continuous type operation. When a batch type operation is used, a quantity of the starting materials, namely the alkyl-substituted furan and the alkene, are placed in a condensation flask which is heated to the desired temperature and subjected to the desired super-atmospheric pressure for a predetermined length of time. At the end of this time the flask and contents thereof is cooled to room temperature and the reaction product comprising an alkyl-substituted epoxycyclohexene is separated from the unreacted starting materials by conventional means, for example, fractional distillation, crystallization, etc.

The epoxide is then placed in another flask, or if so desired, returned to the original flask and subjected to aromatization by means of treatment with the acid such as hydrobromic acid and acetic acid. The aromatized hydrocarbon comprising a benzene containing at least one alkyl substituent is then separated from unreacted epoxide and aromatizing agent by conventional means hereinbefore set forth, usually fractional distillation.

When a continuous type operation is used, the starting materials are continuously introduced to a reactor maintained at suitable operating conditions of temperature and pressure. The reactor may comprise an unlined vessel or coil, or may be lined with an adsorbent material such as fire brick, alumina, dehydrated bauxite, and the like. After a predetermined residence time has been completed, the reaction product comprising the epoxide is continuously withdrawn and introduced to a second reactor containing the aromatizing agent. This aromatizing agent is also continuously admitted to the second reactor through separate means, or if so desired, may be admixed with the epoxide before being introduced to said second reactor. The alkyl-substituted benzene is continously withdrawn, separated from unreacted epoxide, and purified.

Examples of aromatic compounds containing at least one alkyl substituent which may be prepared according to the process of this invention include toluene, ethylbenzene, propylbenzene, o-diethylbenzene, m-diethylbenzene, p-diethylbenzene, o-dipropylbenzene, m-dipropylbenzene, p-dipropylbenzene, 1-methyl-3-ethylbenzene, 1-methyl-4-ethylbenzene, 1-ethyl-2-propylbenzene, 1-ethyl-3-propylbenzene, 1-ethyl-4-propylbenzene, 1,2,4-trimethylbenzene, 1,4,5-trimethylbenzene, 1,4-dimethyl-5-ethylbenzene, 1,4,5-triethylbenzene, etc.

The following examples are given to illustrate the process of the present invention which, however, are not intended to limit the generally broad scope of the present invention in strict accordance therewith.

*Example I*

100 g. of 2,5-dimethylfuran is placed in an autoclave equipped with heating and mixing means. Eethylene is charged to the autoclave until a pressure of approximately 40 atmospheres is reached, after which time the autoclave is heated to a temperature of approximately 180–200° C. At the end of approximately 4 hours the autoclave and contents thereof is cooled to room temperature, the excess ethylene bled off and the resultant 1,4-dimethyl-1,4-epoxy-2-cyclohexene is seperated from the unreacted 2,5-dimethylfuran by fractional distillation under reduced pressure.

The epoxide is then placed in a second reaction vessel along with 200 g. of hydrobromic acid and 200 g. of acetic acid. The flask is heated to a temperature of approximately 60° C. and maintained thereat for approximately two hours after which the flask and contents thereof is cooled to room temperature and the reaction product washed with water and alkali and subjected to fractional distillation. The cut boiling at 138–140° C., comprising para-xylene, is separated out and purified.

*Example II*

100 g. of 2,5-dimethylfuran and 60 g. of 1-butene are placed in an autoclave similar to that described in Example I. Nitrogen is charged to the flask until a pressure of approximately 25 atmospheres is reached. The flask is heated to a temperature of approximately 175–200° C. and maintained thereat for approximately 4 hours. At the end of this time the flask and contents thereof is cooled to room temperature and 1,4-dimethyl-5-ethyl-1,4-epoxy-2-cyclohexene is separated by fractional distillation.

The epoxide is placed in a second reaction vessel along with 200 g. of hydrobromic acid and 200 g. of acetic acid. The flask is then heated to a temperature of approximately 100° C. and maintained thereat for 2 hours. At the end of this time the flask and contents thereof is cooled to room temperature and the reaction product is washed with water and alkali and then is subjected to fractional distillation. A cut boiling at 185–186° C. comprising 1,4-dimethyl-2-ethylbenzene is separated.

I claim as my invention:

1. A process for the preparation of an aromatic compound containing at least one alkyl substituent which comprises condensing an alkylfuran with an alkene, and aromatizing the resultant epoxide in the presence of an acid at an aromatizing temperature of from about 0° to about 150° C. to form the desired alkyl-substituted aromatic compound.

2. A process for the preparation of an aromatic compound containing at least one alkyl substituent which comprises condensing an alkylfuran with an alkene, and aromatizing the resultant epoxide in the presence of a hydrogen halide at an aromatizing temperature of from about 0° to about 150° C. to form the desired alkyl-substituted aromatic compound.

3. A process for the preparation of an aromatic hydrocarbon containing at least one alkyl substituent which comprises condensing an alkylfuran with an alkene, and aromatizing the resultant epoxide in the presence of a hydrogen halide and an organic acid at an aromatizing temperature of from about 0° to about 150° C. to form the desired alkyl-substituted aromatic hydrocarbon.

4. A process for the preparation of benzene containing at least one alkyl substituent which comprises condensing an alkylfuran with an alkene, and aromatizing the resultant epoxide in the presence of a hydrogen halide and an organic acid at an aromatizing temperature of from about 0° to about 150° C. to form the desired alkyl-substituted benzene.

5. A process for the preparation of benzene containing at least one alkyl substituent which comprises condensing an alkylfuran with an alkene, and aromatizing the resultant epoxide in the presence of hydrogen bromide in acetic acid at an aromatizing temperature of from about 0° to about 150° C. to form the desired alkyl-substituted benzene.

6. A process for the preparation of benzene containing at least one alkyl substituent which comprises condensing 2-methylfuran with an alkene, and aromatizing the resultant epoxide in the presence of hydrogen bromide in acetic acid at an aromatizing temperature of from about 0° to about 150° C. to form the desired alkyl-substituted benzene.

7. A process for the preparation of benzene containing at least two alkyl substituents which comprises condensing 2,5-dimethylfuran with an alkene, and aromatizing the resultant epoxide in the presence of hydrogen bromide in acetic acid at an aromatizing temperature of from about 0° to about 150° C. to form the desired alkyl-substituted benzene.

8. A process for the preparation of benzene containing at least two alkyl substituents which comprises condensing 2,5-diethylfuran with an alkene, and aromatizing the resultant epoxide in the presence of hydrogen bromide in acetic acid at an aromatizing temperature of from about 0° to about 150° C. to form the desired alkyl-substituted benzene.

9. A process for the preparation of benzene containing at least two alkyl substituents which comprises condensing 2-methyl-5-ethylfuran with an alkene, and aromatizing the resultant epoxide in the presence of hydrogen bromide in acetic acid at an aromatizing temperature of from about 0° to about 150° C. to form the desired alkyl-substituted benzene.

10. A process for the preparation of benzene containing at least one alkyl substituent which comprises condensing 3-methylfuran with an alkene, and aromatizing the resultant epoxide in the presence of hydrogen bromide in acetic acid at an aromatizing temperature of from about 0° to about 150° C. to form the desired alkyl-substituted benzene.

11. A process for the preparation of benzene containing at least one alkyl substituent which comprises condensing an alkylfuran with ethylene, and aromatizing the resultant epoxide in the presence of hydrogen bromide in acetic acid at an aromatizing temperature of from about 0° to about 150° C. to form the desired alkyl-substituted benzene.

12. A process for the preparation of benzene containing at least one alkyl substituent which comprises condensing an alkylfuran in the presence of propene, and aromatizing the resultant epoxide with hydrogen bromide in acetic acid at an aromatizing temperature of from about 0° to about 150° C. to form the desired alkyl-substituted benzene.

13. A process for the preparation of para-xylene which comprises condensing 2,5-dimethylfuran with ethylene, and aromatizing the resultant epoxide in the presence of hydrogen bromide in acetic acid at an aromatizing temperature of from about 0° to about 150° C. to form para-xylene.

14. A process for the preparation of 1,2,4-trimethylbenzene which comprises condensing 2,5-dimethylfuran with propene, and aromatizing the resultant epoxide in the presence of hydrogen bromide in acetic acid at an aromatizing temperature of from about 0° to about 150° C. to form 1,2,4-trimethylbenzene.

15. A process for the preparation of 1,4-dimethyl-2-ethylbenzene which comprises condensing 2,5-dimethylfuran with 1-butene, and aromatizing the resultant epoxide in the presence of hydrogen bromide in acetic acid at an aromatizing temperature of from about 0° to 150° C. to form 1,4-dimethyl-2-ethylbenzene.

References Cited in the file of this patent

UNITED STATES PATENTS 2,325,576   Balcar _____ July 27, 1943

OTHER REFERENCES

Nudenberg et al.: Journal of the American Chemical Society, vol. 66 (1944), pages 307–8.